July 13, 1948.                F. P. HOCHGESANG                2,445,305
                               RADIATION DETECTOR
Filed Dec. 13, 1944                                        2 Sheets-Sheet 1
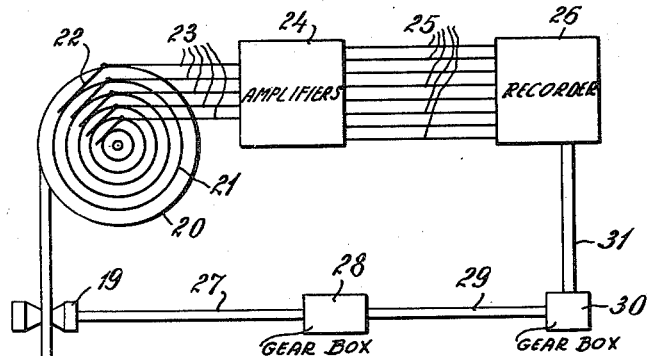
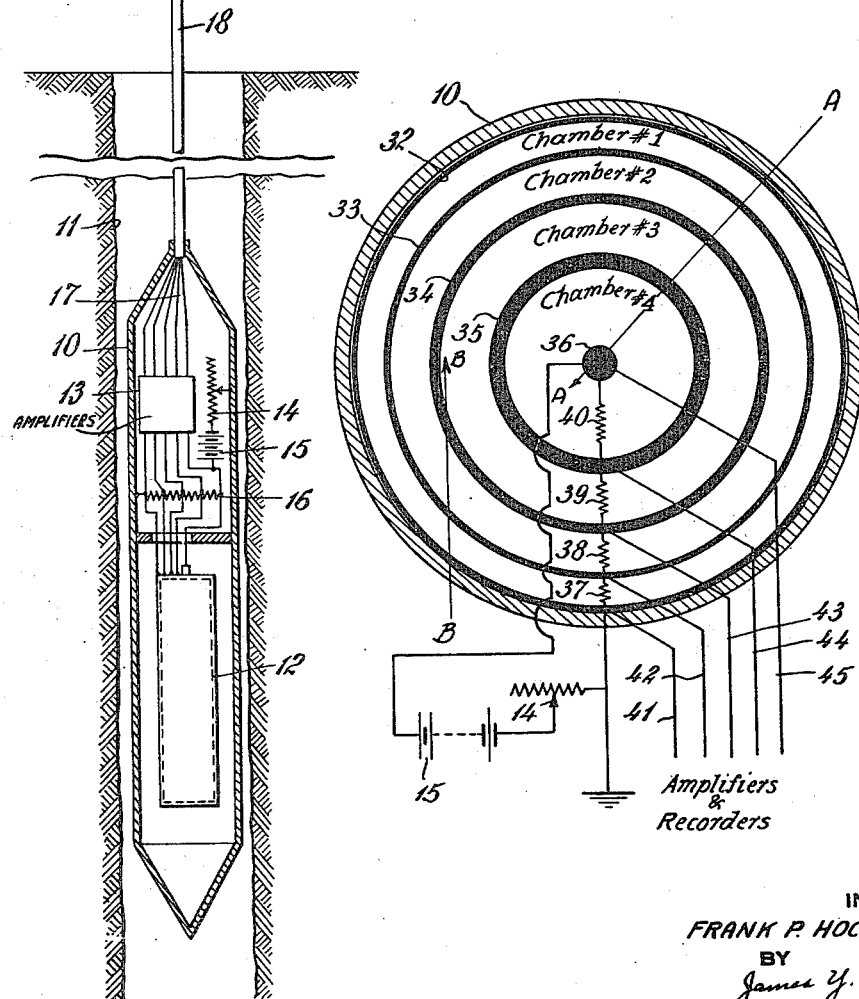
INVENTOR
FRANK P. HOCHGESANG
BY
ATTORNEY

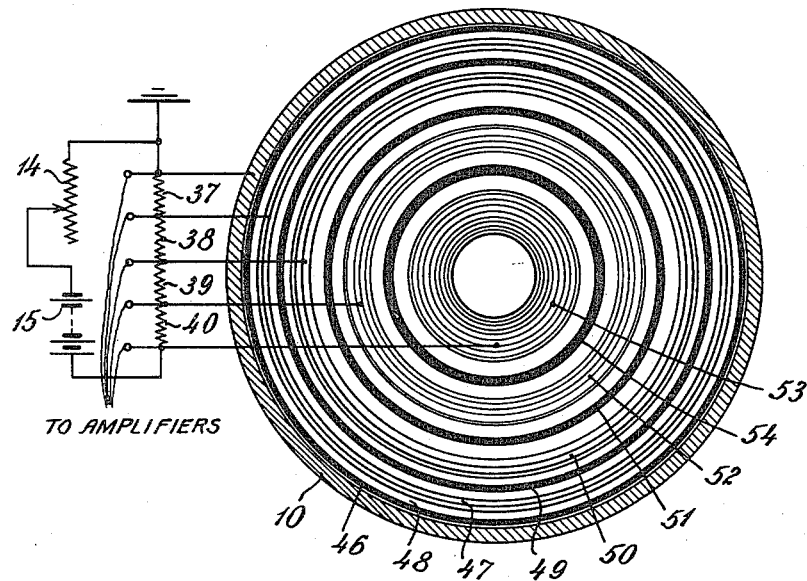
Fig. 3,
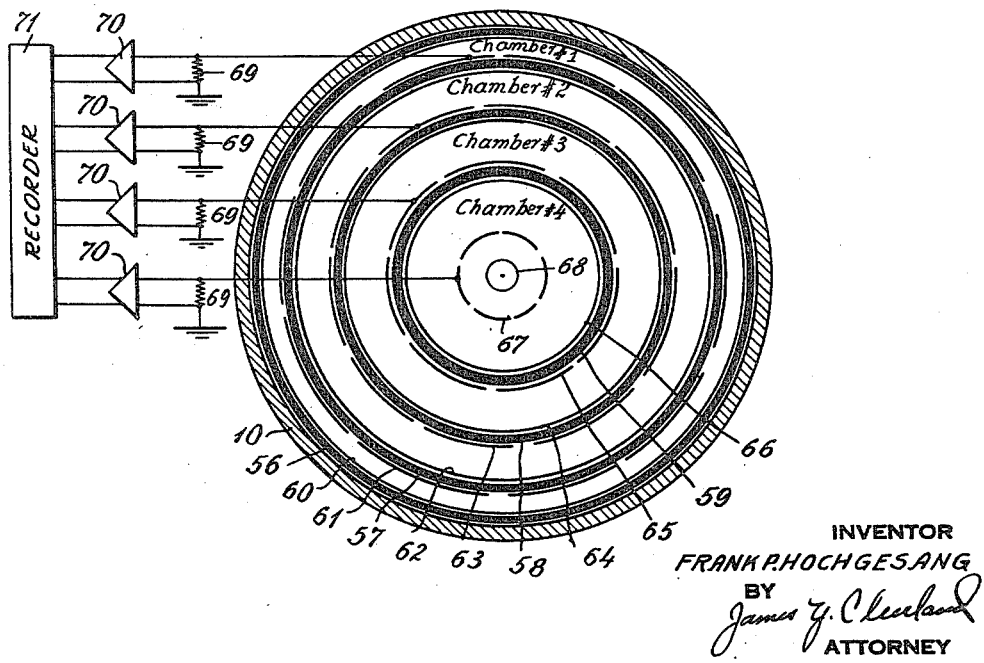
Fig. 4,

Patented July 13, 1948

2,445,305

UNITED STATES PATENT OFFICE 2,445,305

RADIATION DETECTOR

Frank P. Hochgesang, Woodbury, N. J., assignor to Socony-Vacuum Oil Company, Incorporated, a corporation of New York Application December 13, 1944, Serial No. 568,001

16 Claims. (Cl. 250—83.6)

This invention relates to geophysical prospecting and more particularly to a method and apparatus especially adapted to determine the nature of the strata adjacent to a bore hole by measuring both the quantity and the quality of radiation of a penetrating type, such as X-rays and gamma rays emanating from the strata.

This is accomplished by the utilization of a detector that comprises a plurality of separately filtered, concentric ionization chambers so arranged that the innermost responds only to the most penetrating radiation while subsequent outer chambers respond to radiation of decreasing penetrating power and the utilization of a counter or multiple recorder circuit which will indicate or record the amount of radiation reaching each ionization chamber and hence the relating amount of radiation of each falling into each class of penetrating power.

Prior to this invention investigations of geological formations, both from the interior of bore holes and from the surface of the earth, have been made by detecting and measuring gamma radiations emerging from the formations. In every instance, however, except for those described in a patent to Serge A. Scherbatskoy, No. 2,285,840, a patent to Jacob Neufeld, No. 2,296,176 and a patent to Robert E. Fearon, No. 2,351,028, the investigators have been content to measure the total intensity of the gamma rays emanating from the various formations and have not attempted to measure both the quantity and the quality of these radiations to obtain further information.

In the investigations of Neufeld, Scherbatskoy and Fearon, however, it has been discovered that an analysis of the nature of the gamma rays emanating from various formations often yields important additional information as to the nature of the formation. The gamma rays from thorium C'' have a wave length of about $4.66 \times 10^{-11}$ cm. whereas those of radium B+C have a wave length of about $1323 \times 10^{-11}$ cm. Other materials emit gamma rays of still other wave lengths and hence the gamma rays from various formations usually differ in their wave lengths depending upon the material in the formation that gives rise to them.

The present invention yields still further information about the substrata in that it affords a method and apparatus for measuring the quantity and quality of the different photons of X-ray and gamma radiation emanating from the substrata.

Since the energy per quantum, or penetrating ability, of X-rays and gamma rays is directly related to their wave lengths a measure of their energy per quantum, or penetrating power, will suffice to determine their wave lengths and therefore give a spectral analysis of the rays emanating from the different stratum. This is in accordance with the formula $$\text{Energy per quantum} = h\nu = \frac{hc}{\lambda}$$

where $h$ is Planck's constant, $\nu$ the frequency, $c$ the velocity of light, and $\lambda$ the wave length. Therefore, the greater the energy per quantum the shorter the wave length and the greater the penetrating power of the radiation.

Although the total intensity and the different wave lengths of the gamma rays emanating from a particular stratum is an index to the identity of that stratum a specific measurement of the quantity of X-rays or gamma rays of each wave length will furnish a further basis for distinguishing between various strata.

In using the Geiger-Mueller counter for the measurement of gamma rays it has been customary to apply a potential to the electrodes sufficient so that the ionization caused by the action of a single quantum of gamma rays upon a molecule of the gas will be sufficient to cause an electrical breakdown that will permit a current to flow until interrupted by the action of the ballast resistance in the external circuit of the counter tube. The current that flows has no relation in magnitude to the wave length of gamma rays and it is only by counting the number of breakdowns that occur during a given period of time that a determination is made of a substantially fixed proportion of the total number of gamma ray quanta at the point of measurement.

Recently there has come into more general use an ionization chamber in which a higher pressure of gas is maintained. With this higher gas pressure, ionization occurs practically continuously between the electrodes, but the potential applied is not sufficient to cause the breakdown phenomenon to occur and hence there results in the external circuit of the ionization chamber only a substantially continuous current flow of varying magnitude instead of a series of electrical impulses. The magnitude of this substantially continuous current is an indication of the total amount of ionization produced by the gamma rays and hence of the total energy exerted by the gamma rays in causing the ionization. Again, however, nothing is revealed as to the wave length of the gamma rays or the quality of each wave length.

In the patents to Scherbatskoy and Neufeld, mentioned above, measurements of gamma rays are made with two ionization chambers, one of which is shielded to a greater extent than the other so as to eliminate at least a portion of the longer wave length, less penetrating, gamma rays from measurements by that ionization chamber. By a comparison of the measurements made by the two ionization chambers an indication of the average wave length of the gamma radiations is obtained. This indication, however, still fails to indicate whether all of the gamma rays are of some particular intermediate wave length or whether the average is made up of gamma rays of long wave lengths and gamma rays of short wave lengths.

The patent to Fearon discloses the use of a single ionization chamber having a plurality of electrodes and containing a gas having sufficient concentration as will cause the absorption of a sufficient number of quanta of gamma rays to make possible rapid and accurate measurement without at the same time causing an absorption of so many gamma rays that their characteristics cannot be separately recorded. Fearon, by the use of a fast recording galvanometer, records separately the individual impulses produced by a quantum of gamma radiation entering the chamber. Here again, the quantity and quality of each wave length entering the chamber is not determined.

Therefore, the principal object of the present invention resides in the provision of a method and apparatus for detecting and measuring both quantity and quality of a wave length band of radiation of a penetrating type, such as X-rays or gamma rays.

Another object of this invention is the provision of a detector of penetrating radiations, such as X-rays or gamma rays, that comprises a plurality of separately filtered, concentric ionization chambers so arranged that the innermost responds only to the most penetrating rays while subsequent outer chambers respond to rays of decreasing penetrating power.

Still another object of this invention resides in the provision of a detector of penetrating radiations, such as X-ray or gamma rays, that comprises a plurality of separately filtered, concentric ionization chambers in which one or more liquids are used as the ionizable medium.

This invention further contemplates a detector of penetrating radiations in which a solid dielectric, such as sulfur, paraffin, hard rubber and amber, whose electrical conductivity increases when subjected to X-rays or gamma rays, replaces the ionizable gas or liquid.

Still another object of this invention resides in the provision of a detector which employs crystals formed, for example, of selenium whose electrical resistance changes when subjected to gamma or X-ray radiation.

This invention also contemplates a detector of penetrating radiation which comprises a plurality of separate concentric cylinders formed of absorptive material, such as lead, gold, leaded glass, etc. which are coated on the innermost side of each cylinder with a material in which luminescence is induced by irradiation, such as calcium tungstate or any stable materials which are used in the manufacture of X-ray, fluoroscopic or intensifying screens, and having a photosensitive surface placed facing the luminescent material for detecting the light emitted thereby.

Another object of this invention resides in the provision of a novel recording instrument adapted for use with the above-described detectors of penetrating radiation.

Other objects and advantages of the present invention will become apparent with a more complete understanding of the details and advantages of this invention by a consideration of the following description of the preferred embodiments of it. It is to be understood, however, that numerous modifications in the construction of the apparatus and the details of the method may be made without departing from the spirit of the invention. The invention in its broader aspects includes surface exploration as well as exploration in wells or other openings in the earth.

In the drawings:

Figure 1 illustrates a well logging operation employing the apparatus of the present invention;

Figure 2 is a diagrammatic view of a horizontal cross section of an X-ray and gamma ray detector made in accordance with this invention also showing the electrical circuit therefor;

Figure 3 is a similar view of a modified form of detector; and

Figure 4 diagrammatically illustrates a cross-sectional view of still another embodiment of the detector.

As illustrated in Figure 1, a device constructed according to the principles of the present invention may comprise a casing or capsule 10, adapted to be lowered into a well bore 11, which may be either cased or uncased. Within the casing 10, there may be positioned a detector 12, which will be described in detail later, a plurality of amplifiers 13, a variable resistance 14, a battery 15, and a voltage divider resistance 16, all of these elements being electrically connected together with conductors in a manner to be described in connection with another figure of the drawings.

The signal currents from the amplifiers are conducted to the surface through conductors 17, which are embedded in a cable 18, which extends upwardly from the capsule 10, out of the drill hole 11, over a measuring wheel 19 to a drum 20. Drum 20, which receives its power from a source not shown, is adapted to raise or lower the capsule 10, within the drill hole 11. Connection is made to the conductors 17, carried by cable 18, on the drum 20, by means of slip rings 21, and brushes 22. Conductors 23, leading from the brushes 22, connect to the inputs of a plurality of amplifiers 24. The output signals from the amplifiers 24, are conducted by the conductors 25, to the recorder 26, where they are recorded on separate traces in coordination with depth. This is made possible by driving the recorder paper take-up roll by the measuring wheel 19, through shaft 27, gear box 28, shaft 29, gear box 30 and shaft 31.

First refer to Figure 2 for a detailed description of the detector 12. Detector 12, consists fundamentally of a plurality of ionization chambers. The ionization chambers are concentrically disposed with relation to each other. Adjacent the inner walls of the capsule 10, but insulated therefrom is a cylindrical electrode 32. Inside of this cylindrical electrode, but spaced therefrom and insulated both from the electrode 32, and the housing 10, is a second cylindrical electrode 33. Electrodes 32 and 33 define an ionization chamber when the space between them is occupied by an ionizable medium such as argon or nitrogen. Inside of the electrode 33, spaced and insulated therefrom, is still another electrode 34. Electrode 34 is cylindrical and defines with electrode 33, when the space between them is filled with an ionizable medium, a second ionization chamber. Concentrically spaced from, but inside of electrode 34, is still another electrode 35. This electrode is also insulated from the housing and the other electrodes. Electrodes 34 and 35, along with the ionizable medium which fills the space between them, form a third ionization chamber. Inside of electrode 35, is a central electrode 36, which is the innermost electrode of the series. This electrode, with electrode 35 and an ionizable medium, form an ionization chamber which is quite similar to the coventional ionization chamber. Hereafter, in the description of this particular phase of the invention, the ionization chambers will be referred to by numbers. The outermost chamber being No. 1 and the innermost No. 4.

Ionizing potentials are supplied to the electrodes of the ionization chambers by the battery 15 by means of a resistance ladder comprising the resistances 37, 38, 39 and 40. A variable resistance 14, is interposed between the battery 15, and the resistance ladder to provide means for adjusting the applied voltage. When ionization of the gas within the ionization chambers occurs an ionization current will flow through one or all of the resistances 37 to 40, inclusive, depending upon the chamber in which ionization occurs. The flow of ionizing current through these resistances produces I. R. drops which can be taken off by means of the conductors 41, 42, 43, 44 and 45, amplified, transmitted to the surface and recorded. The conductors 41 and 42, will carry a signal that is proportional to the ionization occurring in chamber No. 1; conductors 42 and 43, will carry a signal current that is proportional to the ionization in chamber No. 2; conductors 43 and 44, will carry a signal current corresponding to the ionization occurring in chamber No. 3, and conductors 44 and 45, will carry a signal current that is proportional to the ionization produced in chamber No. 4. The ionization produced in chambers No. 1 to No. 4 will be determined by the number of photons (intensity) of gamma radiation entering the particular chambers.

The cylinders forming the electrode as well as the walls of the concentrically disposed ionization chambers may be formed of a material, such as lead, gold, etc., which absorbs an appreciable quantity of radiation. Further these cylinders shall be electrical conductors, or be coated with a material which is an electrical conductor.

The detecting instrument therefore consists of a series of concentric, cylindrical chambers of ionizable gas, the chambers being separated by concentric absorbent and conducting cylinders.

When desirable the pressure in all gas chambers may be equalized by drilling small holes through the tops or bottoms of the absorbing cylinders thereby interconnecting them. In the preferred form, however, the chambers are sealed from one another so that different gases and different gas pressures can be used in each chamber. In some instances it may be desirable to use in chamber No. 1 a low density gas which is only slightly ionized, for example, air or carbon dioxide, whereas in the chamber No. 4 a heavy, readily ionizable gas, for example, nickel carbonyl, ethyl bromide or dimethyl mercury would be preferred.

With a knowledge of the manner in which X-rays and gamma rays are absorbed the walls can be calibrated in thickness. It can be stated generally that the intensity of a beam of X-rays or gamma rays decreases exponentially as the amount of absorbing matter in its path is increased. If the beam changes in intensity a small amount $-dI$ while passing through an absorbing material whose thickness is $dx$, the fractional change in intensity will then be $$-\frac{dI}{I}$$

where $I$ is the intensity of the beam as it enters the absorber element $dx$. This dimension is proportional to the thickness of the absorber traversed. Therefore, $$-\frac{dI}{I} = \mu dx$$

in which $\mu$ is the linear absorption coefficient or fractional decrease in intensity of the beam per cm. through the absorbing material. By integrating $$I = I_0 e^{-\mu x}$$

or $$\frac{I}{I_0} = e^{-\mu x}$$

where $I_0$ is the initial intensity of the beam and $e$ is the base of natural logarithms.

The linear absorption coefficient, which will be a larger number when the beam is more rapidly absorbed, may also be considered as the fraction of energy absorbed by each cubic centimeter of the matter from a beam of X-rays of one square centimeter cross section. Since the amount of material in a unit volume will vary widely, it is obvious that this absorption coefficient depends on the physical state of the material and is independent of its density $\rho$. Therefore, it is obvious that $$\mu_m = \frac{\mu}{\rho} \text{ or } \mu_m \rho = \mu$$

where $\mu_m$ is the mass coefficient of absorption.

Substituting this value for $\mu$ $$\frac{I}{I_0} = e^{-\mu_m \rho x}$$

or $$\log \frac{I}{I_0} = -\mu_m \rho \times \log e$$

which illustrates the manner in which X-rays and gamma rays are absorbed.

By suitable choice of kind and thickness of the absorbing materials and a suitable number of chambers, it is possible to measure both quantity and quality of the radiation falling on the detector. For example, the innermost chamber would register only the most penetrating, highest frequency, or shortest wave length radiations. The outermost chamber would register radiation of all qualities that have sufficient penetrating power to pass through the wall of the capsule and the adjacent filter layer.

It should be noted that unless the source of radiation is so positioned that its rays will travel through the cylinder along a diameter perpendicular to the axis of the cylinder (path A—A, Figure 2), then the quantity of rays absorbed in any given chamber will be a complex function of quality. For example, a ray traveling along path B—B, Figure 2, may have energy sufficient to enter chamber No. 3, but since it does not travel along a diameter, it registers more strongly in chambers No. 1 and No. 2 due to its longer path length.

However, radiation which does register in any given chamber must have energy greater than the minimum required to pass through the absorption shields in the shortest possible path (i. e. along a diameter). Thus, the device will indicate quality of radiation.

The detector disclosed in Figure 2 may be modified by using as an ionizable medium in the form of a liquid instead of gas.

In Figure 3 there is shown a modified form of detecting device. This form of the detector is based on the established facts that the electrical conductivity of certain solid dielectrics, for example, sulfur, paraffin, hard rubber and amber, increases when these materials are subjected to gamma or X-ray radiation. The most practical material would be a synthetic rubber or resin which has a high sulfur or high halogen content. For desirability, heavy elements such as lead or tungsten in the form of fine powder can be added to the dielectric thereby increasing its absorptive capacity. In some forms of this phase of the invention it may be desirable to use absorptive shields that can be placed throughout the chamber such as in the form illustrated in Figure 2.

As shown in Figure 3 there is disposed inside the wall of the capsule 10, an absorption shield 46, which is insulated or spaced from the inner wall of the capsule 10. Concentrically disposed inside of but spaced from the absorption shield 46, is a dielectric 47, which, as mentioned above, may be formed of sulfur, paraffin, hard rubber, amber, etc. The space 48 between the absorption shield 46, and the dielectric 47, may be filled with an inert, non-conducting gas, or preferably made a vacuum. Inside the dielectric 47, but concentrically spaced therefrom, is an absorption shield 49. The space between the dielectric 47, and the shield 49, may also be filled with an inert, non-conducting gas or preferably made a vacuum. Inside of the absorption shield, concentrically spaced therefrom is still another dielectric 50. The space between this dielectric and the absorption shield 49, may contain an inert gas or be a vacuum. Inside of the dielectric 50 and spaced therefrom by an inert, non-conducting gas or a vacuum is a third absorption shield 51. Dielectrics 52 and 53, which are concentrically disposed inside of the absorption shield 51, are also spaced from each other by appropriate inert, non-conducting gas or vacuums and the absorption shield 54.

A potential difference is applied from top to bottom of each dielectric by a battery 15 by means of a resistance ladder comprising resistances 37, 38, 39 and 40. The variable resistance 14 is provided to adjust the voltages applied to the resistance ladder. The current which flows through each dielectric is amplified and recorded as a measure of the instantaneous intensity of the radiation impinging upon the dielectric.

In Figure 4 there is disclosed still another embodiment of the detecting device forming a part of the present invention. This form of the device is based upon the well-known change of electrical resistance when certain crystals, for example, selenium, are exposed to visible light, ultra-violet rays, X-rays or gamma rays. In this form of the detector the photosensitive crystals on a suitable support are used to replace the dielectric of the form illustrated in Figure 3.

This invention also contemplates a detector which employs an absorptive material, e. g. lead, gold, leaded glass, etc., which has been coated on the innermost surface of the cylinder with a material in which luminescence is induced by irradiation.

In practicing this form of the invention a series of spaced concentrically disposed absorption shields 56, 57, 58 and 59 are placed inside the housing of the capsule 10. Absorption shield 56, has formed on its inner surface a layer 60 of luminescent material. Radiation penetrating shield 56 and striking the layer 60, will illuminate it to a degree proportional to the radiation striking it. In order to measure this illumination as an indication of the intensity of the radiation producing it the outer surface of absorption shield 57, is provided with a layer 61, of photo-sensitive material, such as selenium crystals. The electrical current determined by surface layer 61, can be amplified and recorded.

The inner surface of absorption shield is also provided with a layer 62 of luminescent material which will be activated by radiation that penetrates both of the absorption shields 56 and 57. The illumination thus produced is detected by a photo-sensitive surface 63.

Radiation having sufficient penetrating power to penetrate absorption shields 56, 57 and 58 are detected by placing a layer 64 of luminescent material on the inner wall of absorption shield 58. The illumination of this layer, when activated, is measured by a photo-sensitive layer 65, carried on the outer surface of absorption shield 59.

Stronger radiation which can penetrate all of the absorption shields are detected by a layer 66 of luminescent material which is carried by the inner wall of absorption shield 59. The illumination of this layer, when activated, is measured by a photo-sensitive element 67. Element 67, can be formed by coating the outer surface of a centrally positioned rod 68, with a layer of photo-sensitive material.

The current from each of the photo-sensitive surfaces can be drawn off separately through a high resistance 69 to ground. The I. R. drops thus produced can be impressed on amplifiers 70. The output of the amplifiers can then be recorded as separate traces on a moving recorder strip by the recorder 71. Since the recorder strip of the recorder is driven by the measuring wheel over which the cable passes to lower and raise the capsule, the recording will be made in correlation with depth.

I claim:

1. A method of inspecting penetrating radiations of heterogeneous frequencies, such as gamma or X-radiations, which comprises interposing a plurality of detectors concentrically arranged in the path of said radiations to be inspected, absorbing a selected band of frequencies of such radiation by each of said detectors, and observing the amount of radiation entering each of said detectors.

2. A method of inspecting penetrating radiations of heterogeneous frequencies, such as gamma or X-radiations, which comprises interposing a plurality of ionization chambers concentrically arranged in the path of said radiations to be inspected, absorbing a selected band of frequencies of such radiation by each of said ionization chambers, and observing the amount of radiation entering each of said ionization chambers.

3. A method of recording a spectrum of the frequency bands existing in penetrating radiations of heterogeneous frequencies, such as gamma or X-radiations, that comprises interposing in the path of said radiations whose frequency bands are to be recorded a plurality of concentrically related and serially arranged detectors, each of said detectors having at least one element that changes in electrical characteristics when subjected to the radiations and at least one element that is adapted to absorb a selected band of frequencies of the penetrating radiations, utilizing said change in electrical characteristics to produce a varying electrical signal, amplifying said varying signal, and recording said amplified signal.

4. A method of recording a spectrum of the frequency bands existing in penetrating radiations of heterogeneous frequencies, such as gamma or X-radiations, that comprises interposing in the path of said radiations whose frequency bands are to be recorded a plurality of concentrically arranged detectors, each of said detectors having at least one element that changes in electrical characteristics when subjected to the radiations and at least one element that is adapted to absorb a selected band of frequencies of the penetrating radiations, utilizing said change in electrical characteristics to produce a varying electrical signal, amplifying said varying signal, and recording said amplified signal.

5. A method of recording a spectrum of frequency bands existing in penetrating radiations of heterogeneous frequencies, such as gamma or X-radiations, that comprises serially interposing in the path of said radiations a plurality of concentrically related radiation detectors, interposing between adjacent detectors means for absorbing selected bands of frequencies of radiation, each detector producing electrical signals of amplitude proportional to the radiation entering that detector, separately amplifying the electrical signals produced by each detector, and separately recording the amplified signals.

6. An apparatus for inspecting penetrating radiations of heterogeneous frequencies, such as gamma or X-radiations, which comprises a plurality of concentrically related detectors arranged in the path of said radiations to be inspected, means interposed between adjacent detectors for absorbing a selected portion of such radiation, and means for observing the amount of radiation entering each of said detectors.

7. An apparatus for inspecting penetrating radiations of heterogeneous frequencies, such as gamma or X-radiations, which comprises a plurality of detectors arranged concentrically in the path of said radiations to be inspected, means interposed between adjacent detectors for absorbing a selected portion of such radiation, and means for observing the amount of radiation entering each of said detectors.

8. An apparatus for inspecting penetrating radiations of heterogeneous frequencies, such as gamma or X-radiations, which comprises a plurality of concentrically related ionization chambers arranged serially in the path of said radiations to be inspected, means interposed between adjacent ionization chambers for absorbing a selected portion of such radiation, and means for observing the amount of radiation entering each of said ionization chambers.

9. A multiple ionization chamber comprising in combination, an outer wall defining a chamber, a plurality of concentrically disposed means within said chamber for detecting gamma radiation of different wave length bands by producing proportional electric currents, means interposed between adjacent detecting means for absorbing radiation of selected bands of frequencies, and means for separately and simultaneously conducting said currents to a point outside the chamber.

10. A multiple ionization chamber comprising in combination a housing, an ionizable medium under superatmospheric pressure in said housing, a plurality of spaced concentrically disposed electrodes in said medium, each of said electrodes being formed of a material having a selected gamma ray coefficient of absorption, a source of potential, a voltage divider for said source of potential in the form of a resistance ladder, means for respectively connecting the resistance elements of said ladder to adjacent electrodes to form a plurality of ionization current circuits, whereby currents produced by the ionization of the ionizable medium between adjacent electrodes due to gamma radiation passing therethrough can be measured.

11. An apparatus for recording a wave length band spectrum of penetrating radiation, such as gamma or X-rays, having a plurality of wave lengths that comprises in combination a multiple detector, said detector having a housing, an ionizable medium in said housing, a plurality of spaced concentrically disposed electrodes in said housing dividing the interior thereof into a plurality of ionization chambers, said electrodes being formed of a material having a selected radiation coefficient of absorption, electrode circuits for said ionization chambers, a source of potential in each electrode circuit, means for amplifying the ionization current produced in each ionization circuit, a multiple recorder, and means for transmitting the amplified currents to the recorder for actuation of the same.

12. A multiple detector for detecting penetrating radiations, such as gamma or X-radiations, that comprises in combination a housing, a plurality of concentrically disposed radiation absorbing cylinders in said housing, a dielectric disposed between adjacent pairs of absorbers having the electrical characteristic of changing resistance when exposed to radiation, means for applying separate potentials to the respective dielectrics to produce a current flow therethrough, and means for measuring the variation in current flow through each of the dielectrics due to the instantaneous radiations impinging thereon.

13. A multiple detector for detecting penetrating radiations, such as gamma or X-radiations, that comprises in combination a housing, a plurality of concentrically disposed radiation absorbing cylinders in said housing, a luminescent material on the outer surface of each absorbing cylinder except for the outermost absorbing cylinder, a photo-sensitive material on the inner surface of each absorbing cylinder except for the innermost absorbing cylinder adapted to detect the luminescence of adjacent luminescent surfaces when gamma rays impinge thereon, means for separately measuring the electric current thus produced by each photo-sensitive surface as a measure of radiation.

14. A multiple detector for detecting penetrating radiations, such as gamma or X-radiations, that comprises in combination a housing, a plurality of concentrically related and serially disposed radiation absorbing elements in said housing, a luminescent material carried on a surface of each absorbing element such that radiation will impinge thereon after having traversed the absorbing element, photo-sensitive material carried by the other surface of the absorbing element so that there will be a photo-sensitive surface facing every luminescent surface, means for separately measuring the electrical current produced by each photo-sensitive surface due to the luminescence of the luminescent surfaces caused by radiation impinging thereon.

15. An apparatus for producing a log of a drill hole by inspecting penetrating radiations of heterogeneous frequencies, such as gamma or X-radiation, which comprises a housing adapted to traverse the drill hole, a plurality of concentrically related detectors in said housing arranged serially in the path of said radiations to be inspected, means interposed between adjacent detectors for absorbing a selected portion of such radiation, and means for observing the amount of radiation entering each of said detectors in correlation with the depth of the detectors.

16. An apparatus for surveying a drill hole that comprises a housing adapted to be lowered and raised in the drill hole, means in said housing for defining a chamber, an ionizable medium in said chamber, a plurality of spaced concentrically disposed electrodes in said ionizable medium, said electrodes being formed of a material having a selected radiation coefficient of absorption and further said electrodes dividing the chamber into a plurality of concentrically disposed ionization chambers, and means for separately measuring the ionization current produced by each ionization chamber when radiations enter it.

FRANK P. HOCHGESANG.

REFERENCES CITED

The following references are of record in the file of this patent:

UNITED STATES PATENTS

| Number | Name | Date |
| --- | --- | --- |
| 2,094,318 | Failla | Sept. 28, 1937 |
| 2,288,718 | Kallmann | July 7, 1942 |
| 2,296,176 | Neufeld | Sept. 15, 1942 |
| 2,322,634 | Howell | June 22, 1943 |
| 2,349,753 | Pontecorvo | May 23, 1944 |
| 2,351,028 | Fearon | June 13, 1944 |
| 2,383,477 | Friedman | Aug. 28, 1945 |

OTHER REFERENCES

Korff and Ramsey, article in Review of Scientific Instruments, August 1940, vol. 11, No. 8, pp. 267–269. (Copy in Div. 54.)